*(12)* United States Patent
Gronholm et al.

(10) Patent No.: US 8,510,803 B2
(45) Date of Patent: *Aug. 13, 2013

(54) DYNAMIC NETWORK ACCESS CONTROL METHOD AND APPARATUS

(75) Inventors: Kaj Gronholm, Boulder, CO (US); Michael H. Jamison, Boulder, CO (US); William A. Lamkin, Broomfield, CO (US); Ian S. Nelson, Lafayette, CO (US); Roger Lynn Haney, Jr., Denver, CO (US); Seth Goldhammer, Boulder, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,054

(22) Filed: Jan. 17, 2012

(65) Prior Publication Data

US 2012/0117622 A1    May 10, 2012

Related U.S. Application Data

(62) Division of application No. 11/829,462, filed on Jul. 27, 2007, now Pat. No. 8,132,233.

(60) Provisional application No. 60/888,177, filed on Feb. 5, 2007.

(51) Int. Cl.
*H04L 29/06* (2006.01)
*G06F 17/00* (2006.01)
*G06F 7/04* (2006.01)
*G06F 17/30* (2006.01)

(52) U.S. Cl.
USPC ............... 726/3; 726/1; 726/2; 726/7; 726/8

(58) Field of Classification Search
None
See application file for complete search history.

(56) References Cited

U.S. PATENT DOCUMENTS

| 7,444,368 | B1* | 10/2008 | Wong et al. | 709/200 |
|---|---|---|---|---|
| 2002/0112186 | A1* | 8/2002 | Ford et al. | 713/201 |
| 2005/0213768 | A1* | 9/2005 | Durham et al. | 380/278 |
| 2006/0179324 | A1* | 8/2006 | Hatakeyama | 713/187 |
| 2006/0184530 | A1* | 8/2006 | Song et al. | 707/9 |
| 2007/0056018 | A1* | 3/2007 | Ridlon et al. | 726/1 |
| 2007/0101123 | A1* | 5/2007 | Kollmyer et al. | 713/154 |
| 2007/0101418 | A1* | 5/2007 | Wood et al. | 726/8 |
| 2008/0104665 | A1* | 5/2008 | Naldurg et al. | 726/2 |

* cited by examiner

*Primary Examiner* — Shin-Hon Chen

(57) ABSTRACT

A method of network access control identifies, in response to a request by an end node to access a network, attributes of the end node and of a device receiving the request. Based on the attributes, a network access control implementation is selected from a plurality of network access control implementations to apply to the request.

20 Claims, 6 Drawing Sheets

| E.N. type | E.N. supplicant | E.N. Scan | Entry device | Net cap. | Other enforce | DNS | Auth | Policy |
|---|---|---|---|---|---|---|---|---|
| Local Wired | None | None | LAN Switch no 802.1x | No VLAN | None | Server xyz, forced portal | LDAP | Access Control Process |
| Local Wired | 802.1x version ABC | Microsoft | LAN Switch 802.1X | VLAN | none | Server xyz, VLAN – Auth, visitor, phone | Active Directory | Access Control Process |
| Local Wireless | 802.1x version ABC, 64 bit encrypt | Microsoft | AP 802.1X version 123, 64 bit encrypt | VLAN | Unified Switch | Server xyz, VLAN – Auth, visitor, phone | Active Directory | Access Control Process |
| Remote | VPN version 345 | None | Remote Access, VPN version 345 | No VLAN | IPS | Server xyz | LDAP | Access Control Process |

DYNAMIC NETWORK ACCESS CONTROL METHOD AND APPARATUS

RELATED APPLICATIONS

This application is a continuation (divisional) application of U.S. patent application Ser. No. 11/829,462, filed on Jul. 27, 2007, which is now U.S. Pat. No. 8,132,233, and which claims the benefit of priority to U.S. Provisional Application Ser. No. 60/888,177 titled "Dynamic Network Access Control Method and Apparatus," filed on Feb. 5, 2007, by Gronholm, the disclosures of which are hereby incorporated by reference in their entireties.

FIELD OF THE INVENTION

The invention relates in general to the field of network security and more specifically, to selecting a network access control implementation for end node authorization and posture checking to process a request for access to the network.

BACKGROUND OF THE INVENTION

The use of computer networks has recently grown significantly. As end nodes capable of connecting to a network (hereafter, end node) have become more portable, and users more transient, traditional network security methods based on port segmentation and access lists are no longer sufficiently effective.

Network Access Control (NAC) implementations reduce the risk of an unauthorized end node accessing a network, accessing inappropriate resources within the network, or propagating malicious software in the network. The sophistication of internal and external network attacks from both malicious users and well intended users of end nodes hosting viruses, Trojan horses, worms and malware has increased dramatically. Those factors and others have necessitated the development of more advanced NAC methods. To address the risk of attacks, advanced network access control methods check both the end node authorization level and posture of the end node, i.e., posture checks determine if software that is potentially harmful to other devices on the network has compromised the end node before determining whether or not to grant network access to the end node.

There are three basic components that interact to provide network access control enforcement:

End nodes, which can be either client devices or servers
  The network access and interconnection devices
  Security data and policy stores and servers Each of those three basic components may each support one or more of multiple authorization processes and posture processes. Unfortunately, many vendors have provided propriety NAC solutions for each of those components that are not compatible with other proprietary NAC solutions even when those functions are specified by standards.

The end node capabilities can also vary. An end node may or may not support IEEE 802.1x standard supplicant functions. Also, there are many implementations of the IEEE 802.1x supplicant, since that standard provides a selection of optional allowable methods. The end node may have a way to assess the potential risk of the software on the end node. Network access control may determine both an authorization of an end node and a posture of the end node, e.g., risk of dangerous software, to grant limited, full or no network access to the end node.

The network capabilities vary. The network may or may not support virtual local area networks (VLANs). Network devices that provide access control enforcement can include Ethernet switches, wireless access points, virtual private network (VPN) remote access devices, firewalls, and Intrusion prevention systems (IPS), to name a few. The protocols and enforcement capabilities and device management methods can vary from one network device to another.

The security data and policies can also vary. They may be in Active Director® software from Microsoft Corporation, or on a LDAP server, a DNS server, a policy server, or any other network accessible data store. The available structures of that data and the protocols used to access the data results in many combinations of potential methods to provide network access control of varying effectiveness.

Therefore, there is a need for a system and method to assess the functions of the components needed to provide network access control and determine a NAC implementation that is most effective for the combination of end node, network, and security data to apply to a network access attempt.

SUMMARY OF THE INVENTION

The method of network access control according to the invention identifies, in response to a request by an end node to access a network, attributes of the end node and of a device receiving the request. Based on the attributes, a network access control implementation is selected from a plurality of network access control (NAC) implementations to apply to the request.

BRIEF DESCRIPTION OF THE DRAWINGS

FIG. 3 is a table showing exemplary network environment and end node capability combinations that can use the invention.

DETAILED DESCRIPTION OF THE PREFERRED EMBODIMENT

Figure 1:
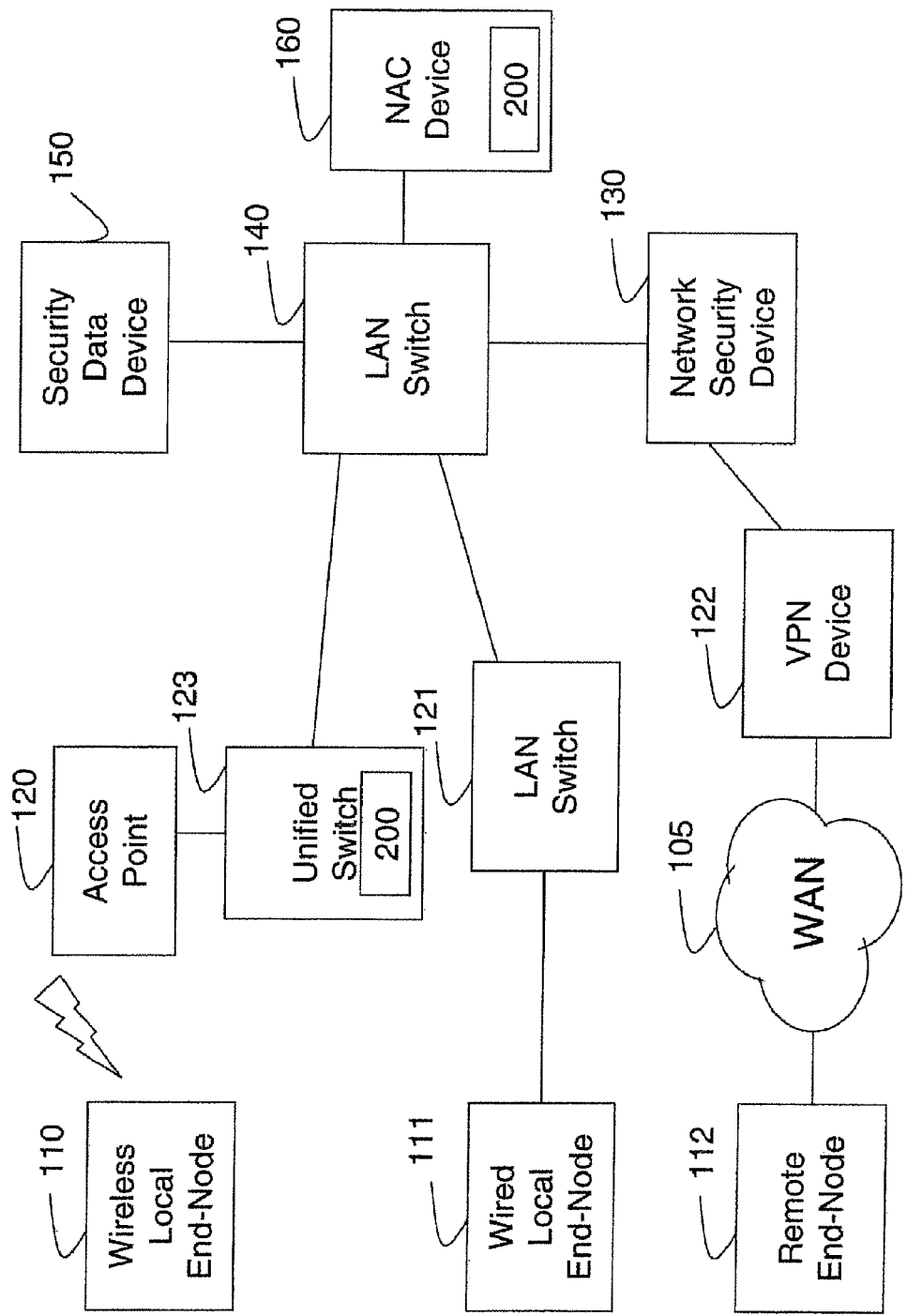
FIG. 1 is a block diagram of a network including the components of network access control used by the invention.

FIG. 1 shows an exemplary computer network 100 that can practice the invention. The network 100 can include at least three different types of end nodes, a local wireless end node 110, a local wired end node, 111, and a remote end node 112, which can be wired or wireless and uses a wide area network (WAN) 105 to connect to the network 100. The network 100 also includes three types of network access devices, a wireless access point 120, shown connected to a unified switch 123, a Local Area Network (LAN) switch 121, and a remote access VPN device 122. Network security device 130 can be a firewall device, intrusion prevention system (IPS) or other known network security device. Network 100 also includes a network interconnection device 140, such as a layer 2 or 3 LAN switch, hub, router or other known interconnection device. A security data device 150 can store end node authorization data, security policies, end node scanning applications, and other security data in an LDAP directory, an Active Directory®, or a file system and is accessible by DHCP, IP, SNMP, or other protocol. A network access control method 200 according to the invention may reside on a standalone device 160. Optionally, while only shown in unified switch 123 of FIG. 1, network access control method 200 can reside on any of the network devices 120-140 or on the security data device 150. The network access control method 200 according to the invention may use information from end nodes, network devices, and security data device to control end node access to the network 100 and can use any of the devices as an enforcement point for a selected NAC implementation.

Network access control (NAC) as contemplated in the present invention, includes the performance of both an authentication method and a posture checking method on an end node requesting access to a network, when one or both of the methods is selected from multiple methods available in the network. The combination of selected authentication and posture checking methods is referred to as a NAC implementation or a selected NAC implementation. The NAC method of the invention is a method for selecting a NAC implementation to perform network access control. Applying a selected NAC implementation to an end node refers to the act of performing both the authentication method and the posture checking method that make up the NAC implementation.

Figure 2:
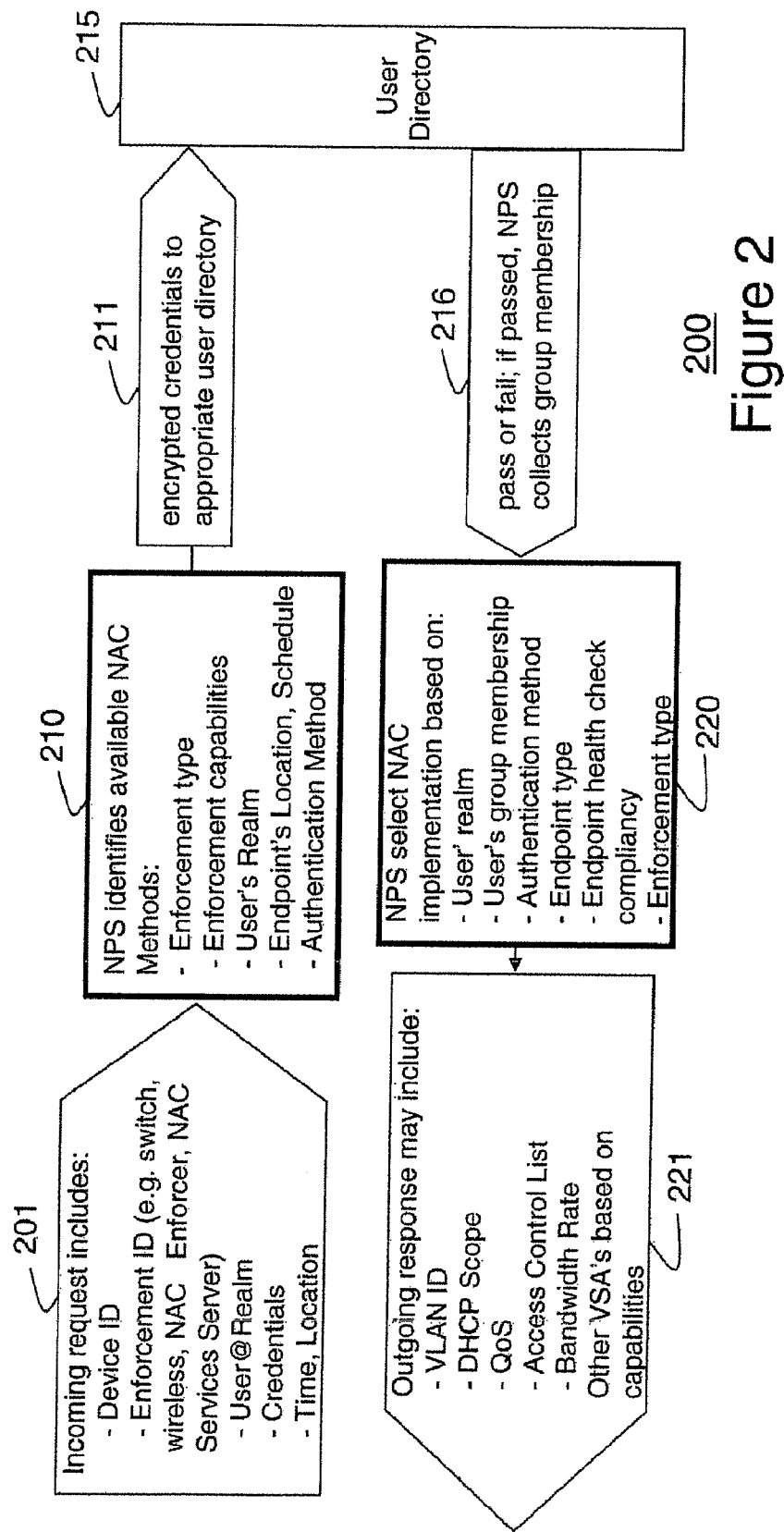
FIG. 2 is a flow diagram of an embodiment of a network access control method for selecting a network access control implementation based on the attributes of an end node and the network.

FIG. 2 shows an embodiment of a network access control method 200 according to the invention. The method 200 identifies available authentication and posture checking methods and selects a network access control implementation to apply to an end node attempting to access a network from multiple possible network access control implementations.

An incoming network access request 201 from an end node, e.g., 110-112 in FIG. 1, via an access device, e.g., 120-122 in FIG. 1, includes attributes of the end node and the access device, which is the enforcement point in this exemplary embodiment. The method identifies 210 available NAC methods, also referred to as credentials 211, of the access device and end node based on the attributes in the request 201. It should be understood that the identification is not limited to attributes in the request, where attributes of the enforcement point may be otherwise known, and attributes of the end node may be known or discoverable. The credentials 211, are sent to a user directory 215, e.g. security system 150 shown in FIG. 1, which returns a pass or fail 216 based on the credentials. The pass or fail 216 determines whether an access attempt will be allowed to take place, based on the credentials 211. In response to receiving the pass or fail 216, a NAC implementation is selected 220 that also can include a security profile for the end node based on elements such as group membership received by security device according to user directory data, end node user realm, authentication method end node type and health check (posture) compliance, and available NAC enforcement. The selection 220 produces a response 221 to the request 201. The response includes data specific to the selected NAC implementation to be enforced, for example, a VLAN ID, DHCP scope, Quality of Service requirements (QoS), Access control list, bandwidth rate, or other vendor specific attributes (VSAs) based on device capabilities.

The functionality of a system using the invention allows for an NAC implementation decision to be made based on a number of attributes of the end node and all known attributes of the enforcement point. The attributes include but are not limited to user identity, if known, device features of the end node and enforcement point such as manufacturer, model, firmware, as well as other attributes such as time of access request and locations of the devices. The invention can then use this information to determine the appropriate NAC implementation. When combined with other known capabilities that may already be on the network, this ability to intelligently determine NAC implementations based on device attributes and network capabilities allows for many options for network access control.

In one embodiment, logic in the system uses a data store of known attributes of each enforcement point that can be updated when new features become available. This logic can take a request for access to the network, e.g., an authentication request, along with the posture of the end node, and send out a response based on known attributes.

The administrator has the ability to determine how many attributes to use based on device, security role, location, schedule and more. For example, if a user is authenticating to a switch that has the ability to handle 802.1x, VLAN, QoS, Bandwidth and a Access Control List (ACL) as well as move and end node with a failed authentication to a guest VLAN, the system would work as follows: a user of an end node attempts to authenticate to the switch port; in response, the system determines the location and time of the request and from there determines the capabilities of that location. The user's security role and end node posture are factored in and then the system sends a response detailing how to perform network access control. If the same user was authenticating to a hub or VPN, different attributes would be sent based on the capabilities of that device.

It should also be understood that in some embodiments a set of attributes may be predetermined for any end node requesting access to the network, any enforcement point in the network. In some embodiments, available network capabilities for a NAC implementation decision may be a subset of actual available network capabilities. It should also be understood that the selected posture checking method may include applying an ordered set of posture checking methods. For example, the selected NAC implementation may first query an end node to determine if it hosts posture checking software, and may then accept an indication from the end node that the end node is virus free. If the first query receives a negative response, a second method in the order may be to request that the end node download posture checking software from the network to execute and provide a response to the network. In the alternative, the network may only accept the result of the downloaded software. It should be understood that there are many other possible alternatives.

FIGS. 1 and 3 are referenced herein to describe four exemplary scenarios that illustrate how the invention determines the network access control implementation to be used upon receipt of a request for access to a network. Again, network access control includes both authorization of the end node to access the network or a subsection of the network and the network accessible resources, and posture checking the end node to assess the risk of malicious software resident on the end node that may cause undesired behaviors on the network. The undesired behaviors include, but are not limited to, spreading software to network connected devices without authorization, consuming resources of network interconnection devices or network accessible resources above a rate of consumption that is allowed by network management policy, snooping on network communications, or accessing, by reading or writing, data that is not authorized for access by the end node. The undesired behaviors may be caused by viruses, Trojan horses, worms and malware, or other forms of software.

Table 300 of FIG. 3 includes rows 301-304. Each row describes device attributes and capabilities within an exemplary network environment that can use the invention. FIG. 1 is used in conjunction with rows 301-304 of FIG. 3 to describe four exemplary network environments that can use the invention depicted in the table 300 in FIG. 3. It should be understood that the invention is not limited to the four exemplary network environments shown in table 300 and can be used in many more and different network environments.

In FIG. 3, the entries in row 305 identify capabilities and attributes of the network environment that are described by the entries in each of rows 301-304, discussed below in turn.

In a network environment represented by row 301, the end node 111 does not have an IEEE 802.1x supplicant implementation, nor does it include software that checks the end node posture. Here, end node 111 is connecting to a Local Area Network (LAN) using a wired Ethernet connection. The end node is connected to a LAN Ethernet switch 121 that does not include IEEE 802.1x functionality, VLANs, or the network access control method 200. Network policy information and end node data store is resident on the security data device 150. The network access control method 200 is resident on the NAC device 160. The network access control implementation selected, based on the attributes and capabilities available in this scenario, is to use DHCP and ARP responses to control what the end node can access until the end node has been authenticated and the end node posture is checked.

When end node 111 connects to the LAN, or is already connected to the LAN and powers up, the end node will attempt to get an IP address assigned by issuing a Dynamic Host Control Protocol (DHCP) request. The NAC device 160 has been assigned to respond to such DHCP requests. The NAC device responds by assigning to the end node an IP address that has restricted access with a first lease time, e.g., a short lease. The NAC device also assigns to the end node a default gateway IP address that is owned by the NAC device 160.

The end node 111 may then attempt to communicate with another end node (not pictured) by transmitting a message in the form of an IP packet(s) including an IP destination address. To communicate with the other IP end node over an Ethernet connection, the end node 111 will determine if the other IP end node is in the same subnet. If it is not in the same subnet, then the MAC address of the transmitted packet will be the MAC address of the default gateway. If it is in the same subnet, then the end node will transmit an Address Resolution Protocol (ARP) request message requesting the MAC address that is associated with the IP address of the other end node.

The ARP request is transmitted to the broadcast MAC address. This message is received by the NAC device 160, which responds with the MAC address of the NAC device so that all packets transmitted to that IP address will be directed by the network to the NAC device and not to the intended destination, i.e., the other end node. In fact, any ARP request transmitted by end node 111 before it has been granted network access will be responded to by the NAC device with the NAC device MAC address. The NAC device monitors a state of the end node 111. The end node 111 opens a browser, but all the HTTP protocol messages are directed to the NAC device 160, and the NAC device presents the end node 111 with a network log on web page. A user of the end node 111 enters a username and password. The NAC device 160 uses the Lightweight Directory Access Protocol (LDAP) to access the end node data on the security data device 150, to determine if the end node is authorized to access the network. In this case the end node 111 is authorized to have full network access. The above described authentication method of the selected NAC implementation is complete. Next, the posture checking method of the selected NAC implementation is applied.

The NAC device 160 presents the end node 111 with a web screen that indicates that it is authenticated and now the posture of the end node 111 is to be checked. Here, the selected NAC implementation includes the above described ordered list of posture checking methods. The NAC device 160 first attempts to determine if the end node 111 has its own posture checking software and determines it does not, so a second method presents a web page to the end node 111, indicating it will down load an application to check the end node posture and request end node user permission to do so, e.g., ask to click here to okay the download. The user at the end node 111 gives permission, e.g., clicks okay, and the application is loaded, runs and reports to the NAC device 160 that the end node posture is acceptable. The NAC device 160 updates the web page to indicate that the posture is acceptable and network access will be granted.

The end node 111 sends a new DHCP request when the short lease on the originally assigned IP address expires. The NAC device 160 now has the end node 111 as being in an authorized full access state and responds to the DHCP request with IP address that has full network access with a second lease time, e.g., a long lease. The ARP request, which now comes from a non-restricted IP address, will be responded to by the other end node (not pictured) or the default gateway 140 and normal IP communication commences.

The second network environment shown in row 302 depicts an end node 111 that does include an IEEE 802.1x supplicant, and it does include software that checks end node posture using, e.g., Microsoft Corporation software. This end node 111 is connecting to a Local Area Network (LAN) using a wired Ethernet connection. The end node is communicatively coupled to a LAN Ethernet switch 121 that does include IEEE 802.1x function and supports VLANs. The network policy information and end node data store is resident on the security data device 150. The network access control method 200 is resident on the NAC device 160. The NAC implementation chosen, because of the attributes of the devices including the network capabilities, is to use the end node 111 supplicant software and to use the 802.1x function in the LAN Ethernet switch 121 to access the security information located on the security data device 150 using LDAP to authenticate the end node. The NAC device 160 will restrict access to the end node 111 after the LAN switch 121 has performed authentication, but before the end node posture has been checked, using DHCP and ARP. The Microsoft posture scan will be used by the NAC device 160 to verify the end node posture.

When the end node 111 connects to the LAN or the already connected end node powers up, the end node will run its 802.1x supplicant code and communicate with the LAN switch 121 to authenticate the end node 111. The LAN switch 121 uses the Lightweight Directory Access Protocol (LDAP) to access the end node data on the security data device 150, to determine if the end node is authorized to access the network. In this case the end node 111 is authorized to have full network access. The LAN switch 121 then allows access to the LAN. The system will point to the switch the proper VLAN, QoS, Bandwidth and Access List for that user, network location and schedule. Other vendor specific attributes may be sent at this time as well. Next the end node will attempt to get an IP address assigned by issuing a Dynamic Host Control Protocol (DHCP) request. The NAC device 160 has been assigned to respond to DHCP requests. The NAC responds and assigns the end node with IP address that has restricted access with a short lease time and assigns the end node a default gateway IP address that is own by the NAC device 160.

The end node 111 then attempts to communicate with another end node (not pictured) by transmitting an IP packet including an IP destination address. To communicate with the other IP end node over the Ethernet connection, the end node 111 will determine if the other IP end node is in the same subnet. If it is not in the same subnet then the MAC address of the packet will be the MAC address of the default gateway. If it is in the same subnet then the end node will send an Address Resolution Protocol (ARP) request message requesting the MAC address that is associated with the IP address of the other end node.

This ARP request is sent to the broadcast MAC address. This message will be received by the NAC device 160 and will respond with the MAC address of the NAC device, so that all the messages sent to that IP address will be directed by the network to the NAC device 160 and not to the intended destination end node. In fact any ARP request transmitted by this end node 111, before it has been granted network access, will receive a response from the NAC device with the MAC address of that NAC device. The NAC device keeps track of the state of the end node 111. The end node 111 opens a browser, but all the HTTP protocol messages are directed to the NAC device 160, and the NAC device presents the end node 111 with a posture check web page.

The NAC device 160 attempts to determine if the end node 111 has its own posture checking software and determines it does, so the status of the posture check is requested. The software on the end node 111 responds indicating the posture is okay. This can be the only posture checking method of the NAC implementation, or a successful application of a first method in an ordered list of posture checking methods in the selected NAC implementation. The NAC device 160 updates the web page to indicate that the posture is okay and that network access will be granted.

The end node 111 will send a new DHCP request when the short lease on the originally assigned IP address expires. The NAC device 160 now has the end node 111 as being in an authorized full access state and responds to the DHCP request with IP address that has full network access with a long lease time. In this case, a VLAN is not assigned unless the switch can handle one. The ARP request, which now comes from a non-restricted IP address, will be responded to by the other end node (not pictured) or the default gateway 140 and normal IP communication can now commence.

The third network environment shown in row 303 depicts a wireless end node 110 connecting to the LAN via a wireless Access Point (AP) 120. The AP 120 is connected to a unified LAN switch 123 via an Ethernet link. The end node 110 contains IEEE 802.1x software as does the unified switch 123. The end node also has posture verification software provide by Microsoft Corporation, Symantec Corporation, Cisco Corporation or another vendor. The LAN supports. VLANs. The network policy information and end node data store is resident on the security data device 150. The network access control method 200 is resident on the unified switch 123. The network access control implementation selected, because the attributes in this scenario, is to use the end node 110 802.1x supplicant, the 802.1x function in the unified switch 123, and use the unified switch 123 to access the security information located on the security data device 150 using Active Directory (LDAP) authenticate the end node.

The unified switch 123 restricts access to the end node 111, until the end node has been authenticated and its posture checked, using DHCP and ARP to protect against the connections to the other end node attached to the same AP and by not forwarding and traffic to the rest of the wired LAN. The Microsoft posture scan will be used by the unified switch 123 to verify the end node posture.

After the end node 110 powers up and attempts to associate with AP 120 using a wireless LAN protocol like 802.11g for example, the end node will run its 802.1x supplicant code and communicate with the unified switch 123 via the AP 120 to authorize the end node 110. The unified switch 123 uses the Active Directory (LDAP) to access the end node data on the security data device 150, to determine if the end node is authorized to access the network. In this case the end node 110 is authorized to have full network access. Next, the end node will attempt to get an IP address assigned by issuing a Dynamic Host Control Protocol (DHCP) request. The unified switch 123 has been assigned to respond to DHCP requests.

The unified switch responds and assigns the end node with IP address that has restricted access with a short lease time and assigns the end node a default gateway IP address that is owned by the unified switch 123. Next the end node 110 will attempt to communicate with another end node (not pictured) using an IP packet containing an IP destination address. To communicate with the other IP end node over the Ethernet connection, the end node 110 will determine if the other IP end node is in the same subnet. If it is not in the same subnet then the MAC address of the packet will be the MAC address of the default gateway. If it is in the same subnet then the end node will send an Address Resolution Protocol (ARP) request message requesting the MAC address that is associated with the IP address of the other end node.

This ARP request is sent to the broadcast MAC address. This message will be received by the unified switch 123, which will respond with the MAC address of the unified switch, so that all the messages sent to that IP address will be directed by the network to the unified switch 123 and not to the intended destination at the other end node. In fact any ARP request sent by this end node 110, before it has been granted network access, will receive a response from the NAC device with its own MAC address. The NAC device keeps track of the state of the end node 110. If there is a persistent client, a posture checking scan is applied, if not, the end node 110 opens a browser, but all the HTTP protocol messages are directed to the unified switch 123, and the unified switch presents the end node 110 with a posture check web page.

The unified switch 123 attempts to determine if the end node 110 has its own posture checking software and determines it does, so the status of the posture check is requested. The software on the end node 110 responds indicating the posture is acceptable. The unified switch 123 updates the web page to indicate that the posture is acceptable and network access will be granted.

The end node 110 will send a new DHCP request when the short lease on the originally assigned IP address expires. The unified switch 123 now has the end node 123 as being in an authorized full access state and responds to the DHCP request with IP address that has full network access with a long lease time. The ARP request, which now comes from a non-restricted IP address, will be responded to by the other end node (not pictured) or the default gateway 140 and normal IP communication can now commence.

The fourth network environment shown in row 304 depicts a remote end node 112 connecting to a remote LAN via the internet or any other Wide Area Network (WAN) 105, for example a person working from home using a VPN connection to corporate headquarters. The VPN device 122 is connected to a network security device 130 via an Ethernet link. The remote end node 112 contains VPN software as does the VPN device 122. In this instance, the end node does not include posture checking software. The LAN does not support VLANs. The network policy information and end node data store is resident on the security data device 150. The network access control method 200 is resident on the NAC device 160.

The network access control implementation selected, because the attributes in this scenario, is to use the remote end node 112 VPN software, the VPN function in the VPN device 122, and use the NAC device 160 to access the security information located on the security data device 150 using LDAP, to authenticate the end node. The network security device 130 will restrict access to the end node 112 until its has been authenticated and its posture has been checked using a policy that directs all traffic from a specified end node to be redirected to the NAC device 160. A posture checking application will be loaded by the NAC device 160 to the remote end node 112 to verify the end node posture.

After the remote end node 112 powers up and attempts to connect with the corporate headquarter LAN with a VPN connection, the VPN software on the remote end node 112 will prompt the user for a username and password. The username and password entered it passed to the VPN device 122. The VPN device 122 looks up the username in the security data resident on the security date device 150 using LDAP to authorize the end node 112. In this case the end node 112 is authorized to have full network access. The remote end node 122 will be assigned an IP address by the VPN device 122.

The VPN device 122 notifies the NAC device 160 that a new remote end node has just been connected and it discloses the IP address to the remote end node 112 by the VPN device 122. The NAC device 160 instructs the network security device 130 that all packets transmitted from the IP address of the remote end node 112 will be redirected to the NAC device 160. The NAC device 160 sends a message to the VPN device 122 to allow the remote end node 112 traffic through. Next, the remote end node 112 opens up a web browser, but all the HTTP protocol messages are redirected to the NAC device 160 by the network security device 130, and the NAC device presents the end node 112 with a posture check web page. The NAC device 160 attempts to determine if the end node 112 has its own posture checking software and determines it does not, so a web page is presented to the remote end node 112 indicating it will down load an application to check the remote end node posture and, as described above, asks user permission, e.g., click here to okay.

The user at the remote end node 112 clicks okay and the application is loaded, the application runs, and reports to the NAC device 160 that the posture is acceptable. The NAC device 160 updates the web page to indicate that the posture is acceptable and network access will be granted. The NAC device 160 send a message to the network security device 130 to stop the traffic redirection and to assign allowable attributes to the remote end node, e.g., a maximum of 10 megabits per second bandwidth during business hours and 30 megabits per second bandwidth on off hours. The remote end node 112 now has bandwidth limited access to the corporate headquarter LAN.

Figure 5:
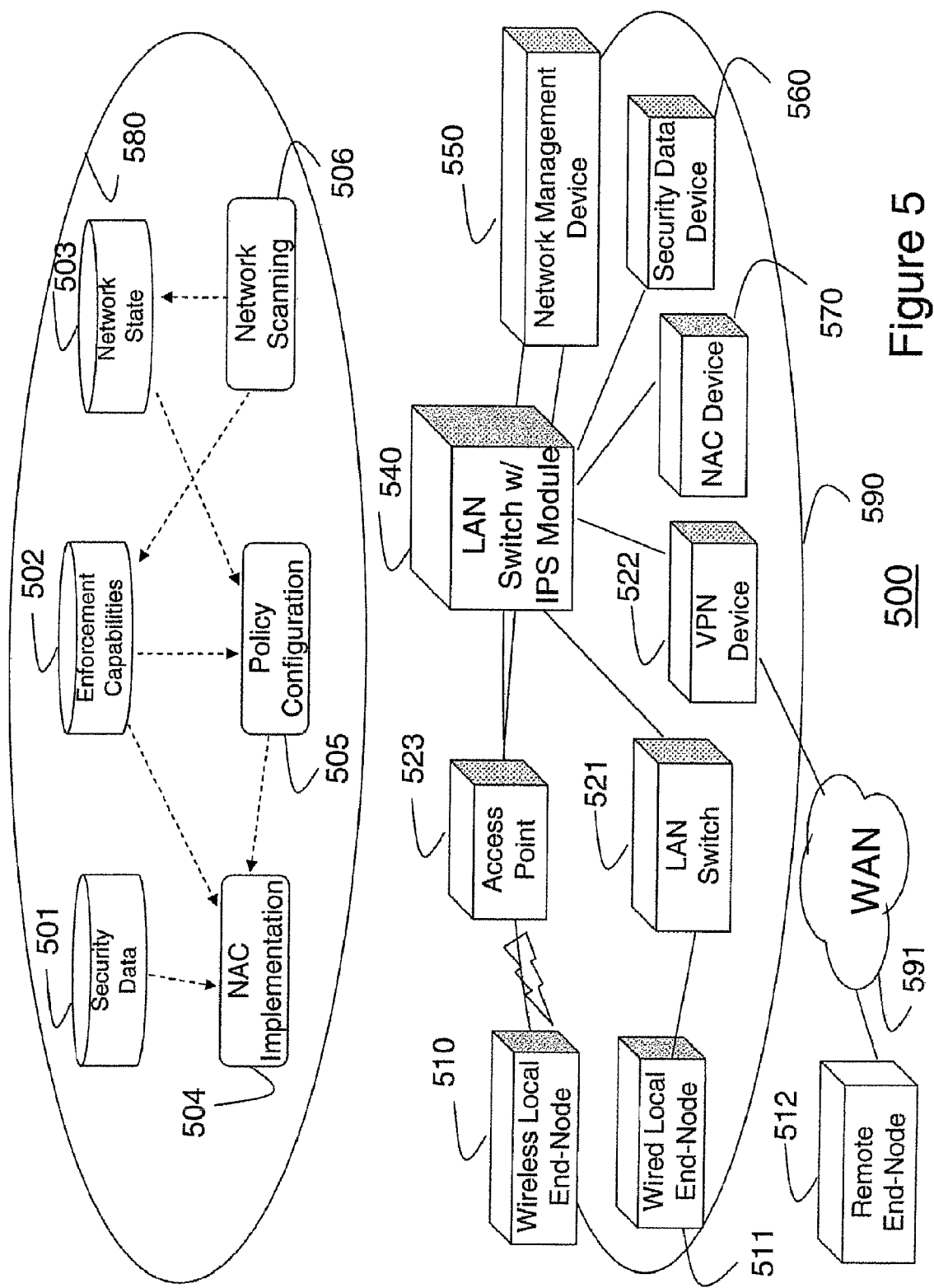
FIG. 5 is a block diagram of a system according to the invention that uses a scanning process.

FIG. 5 shows another embodiment of a system 500 that can use a NAC method according to the invention. The system includes data 501-503 and processes 504-506 used by the invention, referred to generally as processes and data 580. A network scanning process 506 scans the network devices to determine a list of network devices and end node devices connected to network 590, and identifies attributes of each device including a state of each device, network access enforcement capabilities of each device, and a network topology of the connected devices.

The network scanning process 506 updates an enforcement capabilities data store 502 with the identified attributes received from each network scan. Network access control capabilities include available methods for authenticating an end node; available methods to control traffic from the end node to the network such as restricting bandwidth, restricting traffic to one or more VLANs, and filtering traffic based on header and optionally data fields of the traffic to and from an end node. The network scanning process 506 updates the network state data store 503 with the information received from each network scan, i.e., identified attributes. The network state data store 503 includes information about the state of each of the devices connected to the network where this information includes one or more items as such as, operational state (e.g., non-operation, operational, backup. etc.), network access control enforcement enabled, state of network interfaces, and event log.

The network scanning process identifies the attributes by communicating with the device or by reading information gathered by existing network management systems.

The policy configuration process 505 reads the network state data store 503 to determine where devices 580 reside within the network topology and their associated attributes. The policy configuration process 505 reads the enforcement capabilities data store 502 to determine if and how each device can enforce one or more of the steps to authenticate and check the posture of the end nodes and to restrict or allow traffic from or to the end node and the network 590.

The network state information and the enforcement capabilities information are attributes used by the policy configuration process 505 to determine which device or devices should enforce one or more steps of a network access control implementation and what methods are included in the NAC implementation. The policy configuration process 505 configures the devices connected to the network to perform the steps used in network access control implementation.

Referring to FIG. 5 the policy configuration process 505 would configure the VPN Device 522, the IPS Module in the LAN Switch 540, and possibly the end nodes Wireless Local End node 510 connected to network 590 by access point 523, Wired Local End node 511 connected to network 590 by LAN switch 521, or Remote End node 512 connected to network 590 by wide area network (WAN) 591, to perform authentication, check the end node posture, and enforce traffic restrictions if applicable.

There are network configurations that do not have any or a compatible set of enforcement processes to provide network access control. As a default, the policy configuration process 505 can configure a handler process 610, see FIG. 6, to be the sole enforcement method or an intermediary between one or steps in the selected NAC implementation 504 (e.g., Process A 601 in FIG. 6) and data stores or processes, more details of the FIG. 6 follow.

Once the policy configuration process 505 configures the devices, the network 590 is enabled to perform network access control. The policy configuration process 505 monitors both the network state information 503 and the enforcement capabilities 502 to react to changes in the network and reconfigure the device providing network access control steps. The Policy Configuration process 505 provides dynamic agile network access control that adjusts to network changes by periodically assessing the network structure and capabilities, using this information to determine how to configure the network devices to provide network access control with the latest information.

The selected NAC implementation 504 operates on one or more devices 510-570 and end nodes and is configured by the policy configuration process 505 to perform one or more steps in the network access control implementation.

The end nodes, Wireless Local End node 510, Wired Local End node 511, or Remote End node 512 may have one or more of the following capabilities; the ability to use an authentication protocol; the ability to check and report the end node posture; the ability to control traffic from the end node to the network such as restricting bandwidth, restricting traffic to one or more VLANs, and filtering traffic. For example an end node may have the ability to exchange IEEE 802.1x messages to perform authentication of the end node. The end node may also have the capability to restrict traffic to one or more VLANs by tagging the packets carrying the network traffic.

The VPN Device 522 may have one or more of the following capabilities; the ability to use an authentication protocol to verify the identity and access rights of the Remote End nodes 512 attempting to access the network 590; restrict bandwidth; the ability to check and report the Remote End node 512 posture; the ability to control traffic from the Remote End node 512 to the network 590 such as restricting bandwidth, restricting traffic to one or more VLANs, and traffic filtering. The selected NAC implementation 504 operates in the VPN Device 522 to provide one or more of the network access control steps and is configured by the Policy Configuration process 505. For Example, The VPN device can authenticate the remote end node.

The LAN Switch with IPS Module 540 may have one or more of the following capabilities; the ability to use an authentication protocol to verify the identity and access rights of the Remote End nodes 512 attempting to access the network 590; restrict bandwidth; the ability to check and report the Remote End node 512 posture; the ability to monitor traffic and identify network threats; the ability to control traffic from the Remote End node 512 to the network 590 such as restricting bandwidth, restricting traffic to one or more VLANs, and traffic filtering. The selected NAC implementation 504 operates in the VPN Device 522 to provide one or more of the network access control steps and is configured by the Policy Configuration process 505.

The NAC Device 570 may alone host the selected NAC implementation 504 or may host the Handler Process 610 to acts a an intermediary between one or more steps in the selected NAC implementation 504 (e.g., Process A 601 in FIG. 6) and data stores or processes. The NAC Device 570 may also host one or more the Enforcement Capabilities 502 and Network State 503 data stores.

The Network Management Device 550 may host the Network Scanning process 506 to gather information about the network devices, structure, capabilities, and state. The Network Management Device 550 may host the Network State data store and provide information to the Policy Configuration process 505.

The Security Data Device 560 may host the Security Data 501 and provide information to the selected NAC implementation 504 operating on network 590.

The Wireless Local End node may host the Enforcement Method 510 to provide authentication and posture check steps.

Figure 6:
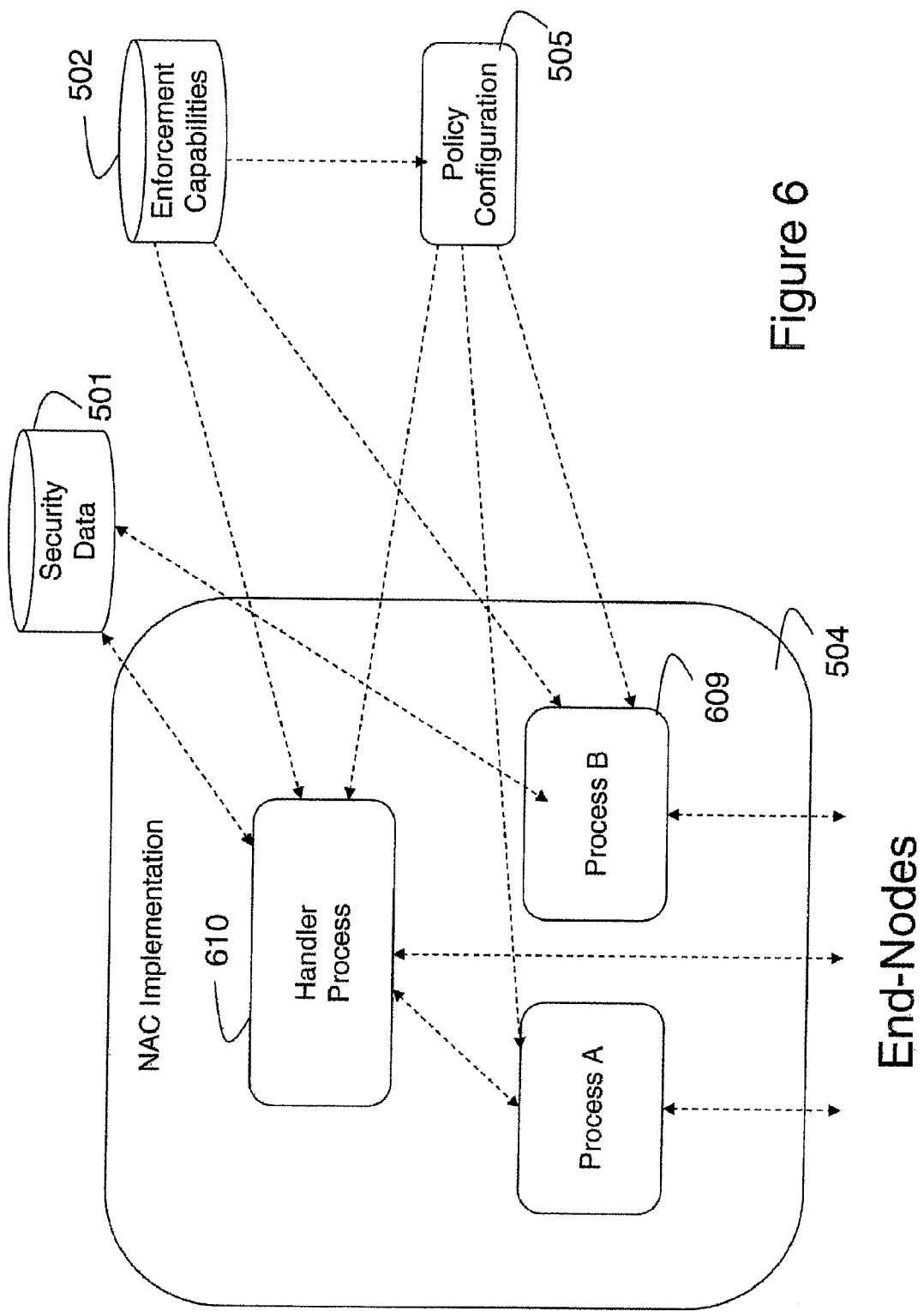
FIG. 6 is a block diagram of a NAC implementation that uses the handler process of FIG. 4.

FIG. 6 shows an embodiment of the NAC implementation 504 of FIG. 5. There are network configurations that do not have any or a compatible set of authentication methods or posture checking methods to provide network access control. The Policy Configuration process 505 can configure a Handler Process 610 in FIG. 6 to be the default NAC implementation when are is no other NAC enforcement capabilities found on the network as in the scenario depicted in row 301 of FIG. 3 described in detail above. The Policy Configuration process 505 can configure a Handler Process 610 in FIG. 6 to be an intermediary between one or more steps in the NAC implementation 504 (e.g., Process A 608 and process B 609, shown in FIG. 6) and data stores or processes as described in row 304 of FIG. 3 where the IPS module 540 is configured to redirect traffic to the NAC device before posture of the remote end node 512 is checked.

The Handler Process 610 can be configured to intercept authentication or posture checking messages and either respond to the messages or modify the messages and forwarding the message to the intended or newly modified destination address. This modification of messages can allow two or more parts of the network access control implementation to interoperate, where without said modification the methods that make up the NAC implementation would not provide the configured NAC implementation results.

Figure 4:
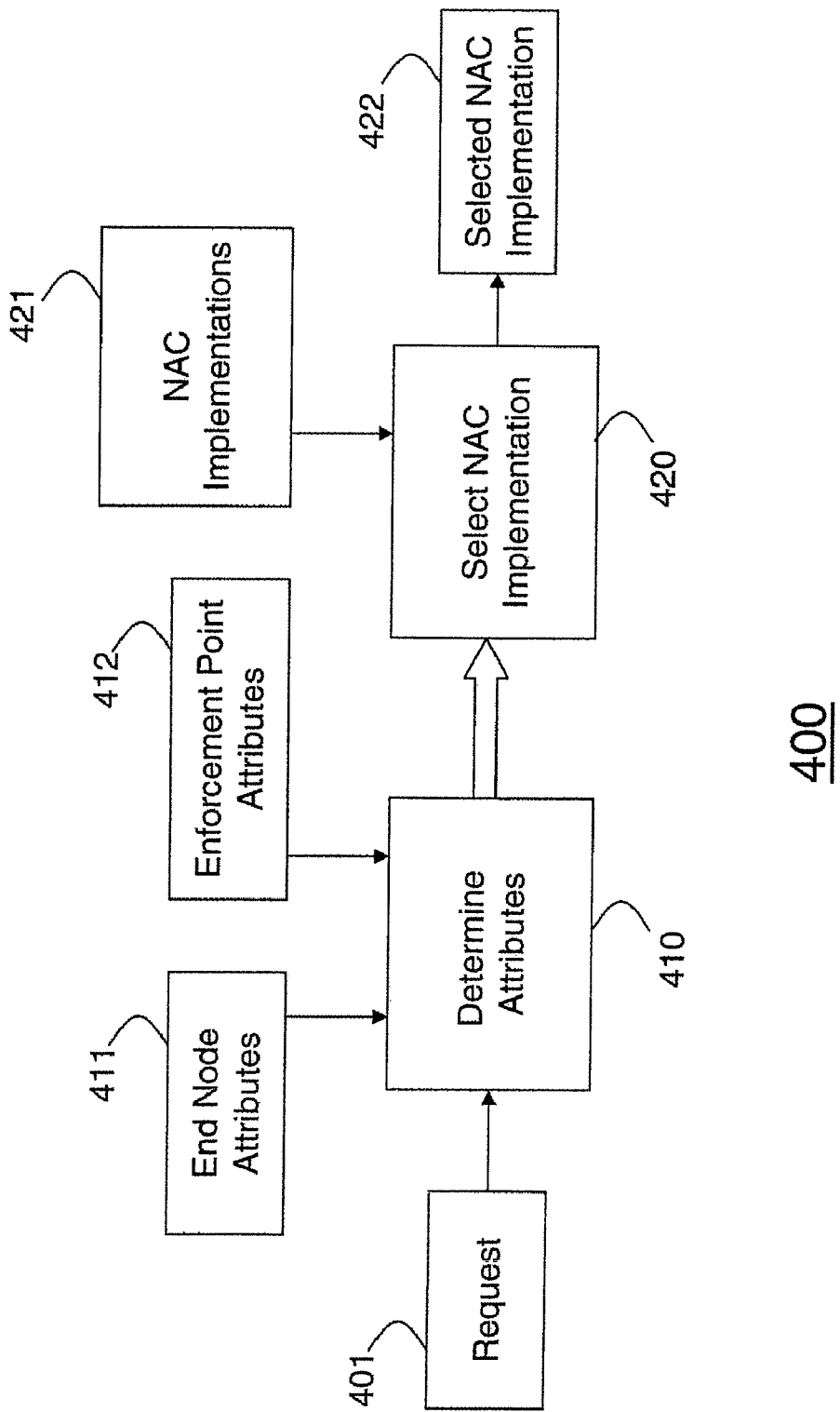
FIG. 4 is a block diagram of a handler process according to the invention.

The Handler Process 610 can also be configured to carry out an embodiment of network access control method 200 of FIG. 2. The NAC method 400 according to this Handler Process configuration is depicted in FIG. 4. End node requests 401 are received and attributes 411 of the end node and attributes 412 of an enforcement point, which reside on the Enforcement Capabilities data store 502, are determined 410; and a network access control implementation 422 is selected 420 from multiple available NAC methods 421, which reside on the Enforcement Capabilities data store 502, based on the attributes 411 and 412. The selected NAC implementation is applied to the request as described above. The Selected NAC Implementation 422 may instruct the Handler Process 610 to either respond to the request or modify the request and forwarding the request to the intended or newly modified destination.

Embodiments of the present invention facilitate deploying a network access control subsystem in existing networks, by providing techniques for enabling the network access control subsystems to discover the functions provided by the network and the functions provided by the end node attempting to access the network; and determining which devices provide assistance in authenticating an end node and checking the end node posture. This agile NAC system can:

improve interoperability improve network fault tolerance ease network adds, moves, and changes Due to the NAC process ability to choose the method and devices to implement the selected network access control method, devices that do not by themselves interoperate can be deployed in the network. Interoperability is provided when there are a variety of devices deployed in the network by either, choosing devices and methods that interoperate, or by acting as an intermediary between devices with different implementations.

Network fault tolerance can be enhanced by the embodiments of the invention by the NAC process monitoring the network configuration, state, and capabilities and utilizing this up to date information to dynamically adjust the NAC enforcement configuration in accordance with the latest changes. The NAC process monitors the operational state of the network access devices, IPS devices, security data devices and modifies the policies to only utilize the device presently in the proper operation state.

The NAC process provides uninterrupted network access control through network configuration changes. Network configuration changes include adding devices and links to the network, moving network devices or links, and configuration changes to networks by adding, deleting, or upgrading network capabilities or parameters. The NAC process monitors the present network configuration and adjusts the network access control methods and selected devices to implement the configured methods to best utilize the present network configuration. This allows the network administer more freedom to modify and migrate the network in a step wise manner without be overly concern with the mix devices and capabilities at each step of the change. This eases network adds, moves, and changes and does not require wholesale network wide consistent changes.

The invention claimed is:

1. An apparatus for network access control, said device comprising:
   a memory storing machine readable instructions to:
      identify attributes of an end node that requests access to a network and of a device receiving the request; and
      select, based on the attributes of both the end node and the device receiving the request, a network access control implementation from a plurality of network access control implementations to apply to the end node, wherein the plurality of network access control implementations include different combinations of authentication and posture checking implementations, wherein the posture checking implementations comprise a plurality of implementations to determine if the end node has stored thereon software that is potentially harmful to other devices on the network, and wherein the attributes of the and node and the device receiving the request comprise at least one of user identity, manufacturer, model, firmware, time of access request, and locations of the end node and the device receiving the request; and
   a processor to implement the machine readable instructions.

2. The apparatus according to claim 1, wherein the memory further comprises machine readable instructions to grant a network access level to the end node based on a result of application of the selected network access control implementation.

3. The apparatus according to claim 2, wherein the network access level granted to the end node is no network access.

4. The apparatus according to claim 2, wherein the network access level granted to the end node is limited network access.

5. The apparatus according to claim 2, wherein the access level granted to the end node is full network access.

6. The apparatus according to claim 1, wherein the memory further comprises machine readable instructions to select devices in the network to perform the selected network access control implementation.

7. The apparatus according to claim 1, wherein the memory further comprises machine readable instructions to scan the devices in the network to determine a list of network devices and end node devices connected to the network, and to identify attributes of the network devices and end node devices connected to the network.

8. The apparatus according to claim 1, wherein the posture checking implementations comprise a plurality of different software to be executed on the end node to determine if the end node has stored thereon software that is potentially harmful to other devices on the network.

9. The apparatus according to claim 8, wherein the memory further comprises machine readable instructions to determine whether the end node comprises a posture checking software.

10. The apparatus according to claim 9, wherein the memory further comprises machine readable instructions to request that the end node provide a status of a posture check performed by the posture checking software in response to a determination that the end node comprises the posture checking software.

11. The apparatus according to claim 9, wherein the memory further comprises machine readable instructions to supply a posture checking software to the end node in response to a determination that the end node does not comprise a posture checking software and to request that the end node provide a status of a posture check performed by the posture checking software.

12. An apparatus for network access control, said device comprising:
   a memory storing machine readable instructions to:
      identify attributes of devices in a network, wherein the devices comprise an end node device and a device to receive a request from the end node; and
      select, based on the attributes of the devices, a network access control implementation from a plurality of network access control implementations to apply to a request by the end node device to access the network, wherein the plurality of network access control implementations include different combinations of authentication and posture checking implementations, wherein the posture checking implementations comprise a plurality of implementations to determine if the end node device has been compromised with stored thereon software that is potentially harmful to other devices on the network, and wherein the attributes of the network devices comprise at least one of user identity, manufacturer, model, firmware, time of access request, and locations of the network devices; and
   a processor to implement the machine readable instructions.

13. The apparatus according to claim 12, wherein the memory further comprises machine readable instructions to scan the devices in the network to determine a list of network devices and end node devices connected to the network and to identify attributes of the network devices and end node devices connected to the network.

14. The apparatus according to claim 12, wherein the memory further comprises machine readable instructions to implement the selected network access control implementation through use of a handler process.

15. The apparatus according to claim 12, wherein the posture checking implementations comprise a plurality of different software to be executed on the end node device to determine if the end node device has stored thereon software that is potentially harmful to other devices on the network.

16. The apparatus according to claim 15, wherein the memory further comprises machine readable instructions to determine whether the end node comprises a posture checking software.

17. The apparatus according to claim 16, wherein the memory further comprises machine readable instructions to request that the end node provide a status of a posture check performed by the posture checking software in response to a determination that the end node comprises the posture checking software.

18. The apparatus according to claim 16, wherein the memory further comprises machine readable instructions to supply a posture checking software to the end node in response to a determination that the end node does not comprise a posture checking software and to request that the end node provide a status of a posture check performed by the posture checking software.

19. A non-transitory computer readable storage medium on which is embedded a set of machine readable instructions that when executed by a processor, implement a method for controlling network access, said machine readable instructions comprising code to:
- identify, in response to a request by an end node to access a network, attributes of the end node and of a device receiving the request;
- select, based on the attributes of both the end node and the device receiving the request, a network access control implementation from a plurality of network access control implementations to apply to the end node, wherein the plurality of network access control implementations include different combinations of authentication and posture checking implementations, wherein the posture checking implementations comprise a plurality of implementations to determine if the end node has stored thereon software that is potentially harmful to other devices on the network, and wherein the attributes of the and node and the device receiving the request comprise at least one of user identity, manufacturer, model, firmware, time of access request, and locations of the end node and the device receiving the request.

20. The non-transitory computer readable storage medium according to claim 19, wherein the machine readable instructions further comprise code to:
- grant a network access level to the end node based on a result of applying the selected network access control implementation.

* * * * *

UNITED STATES PATENT AND TRADEMARK OFFICE
CERTIFICATE OF CORRECTION

PATENT NO. : 8,510,803 B2  
APPLICATION NO. : 13/352054  
DATED : August 13, 2013  
INVENTOR(S) : Kaj Gronholm et al.

Page 1 of 1

It is certified that error appears in the above-identified patent and that said Letters Patent is hereby corrected as shown below:

In the Claims

In column 13, line 29, in Claim 1, delete "and node" and insert -- end node --, therefor.

In column 15, line 20, in Claim 19, delete "and node" and insert -- end node --, therefor.

Signed and Sealed this  
Tenth Day of December, 2013

Margaret A. Focarino  
*Commissioner for Patents of the United States Patent and Trademark Office*